United States Patent Office 3,521,138
Patented July 21, 1970

3,521,138
THERMAL STARTING DEVICE FOR A SINGLE-PHASE ASYNCHRONOUS MOTOR
Arne F. Enemark, Sonderborg, and Holger V. Vind and Andreas T. Schack, Nordborg, Denmark, assignors to Danfoss A/S, Nordborg, Denmark, a company of Denmark
Filed Apr. 2, 1968, Ser. No. 718,147
Claims priority, application Germany, Apr. 5, 1967, D 52,708
Int. Cl. H02p *1/44*
U.S. Cl. 318—221                                 11 Claims

ABSTRACT OF THE DISCLOSURE

A thermally-responsive starting device for single phase asynchronous motors having a main winding and a starting winding. The device comprises a bimetallic switch connected in use in series with the starting winding for disconnecting it after a predetermined time. A first heat source opens the switch and comprises a tubular body circumferentially of the switch with a heating coil around thereof connected across the windings of the motor. A second heat source likewise connected across the windings of the motor holds the switch open when opened in response to heating thereof from the first heat-source.

---

This invention relates generally to starting devices for single-phase asynchronous motors and more particularly to a thermally-responsive starting device for such motors.

Thermally-responsive starting devices are known in which a bimetallic switch is opened after a certain amount of delay under the influence of an opening heat source and then is held open by a holding or second heat source until the motor is switched off. These devices generally have design problems particularly if the motor in which they use uses a resistance starting phase, if the auxiliary or starting winding is made in a single layer only, and if the remaining resistance of the starting phase is concentrated in the heat source that effects the opening of the switch. In such devices the starting device must then be capable of absorbing a high output for a short time, for example an output of 1000 watts in the case of the starting current in the auxiliary phase of five amperes and a series resistance of 40 ohms. This output, however, should neither shorten the delay time too much nor cause the temperature of the various parts of the starting device to exceed a given limiting value.

If an opening heat-source comprising a heating coil is used then the heating coil easily burns through. It is desirable for the opening heat source to cool rapidly so that the reliable operation of the starting device is insured even when the motor is stopped a short time. Moreover, the starting device should be made of parts which are of simple construction and are compact so that the arrangement occupies as little space as possible.

It is a principal object of the present invention to provide a thermally-responsive starting device that effects or fulfills the above conditions.

A feature of the thermally-starting device in accordance with the invention is the provision of a hollow body of high heat capacity surrounding the bimetallic switch circumferentially and thermally-conductively associated with the bimetallic switch and with a second or holding heat source.

The hollow body has a thermally inert mass mounted thereon which is used to adjust any required delay time for opening of the switch. The bimetallic switch only slightly lags behind the temperature of the hollow body since it is not only thermally-conductively associated therewith but is also influenced by a considerable part of the radiation from the inner walls of the hollow body. The hollow body has a large surface compared with its mass so that it will rapidly cool and dissipate the heat in order to allow restarting of the motor after a short interval of stoppage thereof. The space required for the device or apparatus is small since the essential parts of the switch are disposed within the hollow body. A holding heat source is heated by and at the same time as the opening heat source so that when the opening heat source is switched off the holding heat source is at approximately the temperature that it should have for holding the switch open.

A heat-conducting transverse wall connected to the hollow body and in direct contact with a bridge has the foot of the bimetallic switch and the second or holding heat source mounted on an opposite side thereof near the foot of the bimetallic strip of the switch. This heat-conductive transverse wall forms a thermally conductive connection between the hollow body and the bimetallic switch on the one hand and between the holding heat source and the bimetallic switch on the other hand, and provides the mount for the second heat source and the switch.

The hollow body, circumferentially of the switch, is cylindrical and made of a metal externally of which is mounted a resistance heating winding. The transverse wall is provided internally of the hollow body extending axially therein having the bimetallic switch secured on one side of this wall in a thermally-conductive manner and the holding heat source on the other side in like manner. The transverse wall serves as a heat conductive bridge and reinforces the hollow body.

The transverse wall extends over approximately the entire length of the hollow body so that heat is thereby carried away from the entire length of the body and transferred to the bimetallic switch. In one embodiment of the invention the transverse wall projects from the cylindrical body and has a V-shaped notch defining a space for movement of the switch bimetallic strips contained within the hollow body.

Preferably the hollow body is made of aluminum the surface of which is provided with an integral, electrically insulating layer, for example an oxide layer or "skin." Such a body has excellent thermal conductivity and the insulating layer does not adversely effect thermal conduction from the winding to the bimetallic switch if it affects it at all. The inner surface of the hollow body may be blackened so that this inner surface operates as a black radiator thereby having a correspondingly greater efficiency.

Other features and advantages of the thermally-responsive starting device in accordance with the present invention will be better understood as described in the following specification and appended claims, in conjunction with the following drawings in which:

Figure 1:
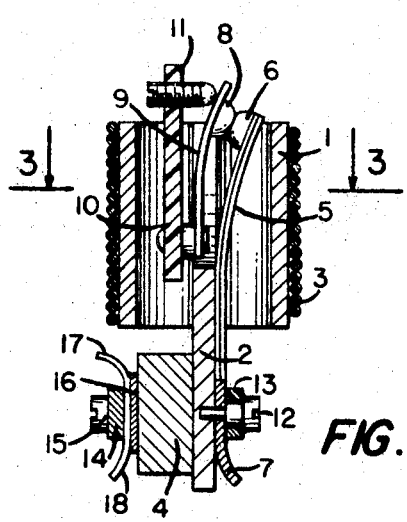
FIG. 1 is a longitudinal section of a first embodiment of the thermally-responsive device in accordance with the invention.

A first embodiment of the invention is illustrated in FIGS. 1–4 in which a first or opening heat source consists of a hollow cylinder 1 made of aluminum provided with a transverse wall 2 extending axially thereof. A single layer heating coil 3 made of a heat resistor wire is wound circumferentially around the hollow body axially thereof. The composite body 1, 2 is made of sufficiently large enough mass to impart to it a substantial heat capacity while being likewise constructed to readily dissipate heat quickly.

A holding heat source comprises a positive temperature coefficient resistor 4 made in the form of a cylindrical ceramic body. A bimetallic switch is provided consisting of a bimetallic strip 5 with a contact 6 on a free end thereof and a connector strip 7 and another contact 8 secured to another strip mounted on a carrier plate 10. An adjust screw 11 is inserted in the plate 10 by means of which the strip 9 can be prestressed and the delay time of the switch can be readily adjusted thereby. The bimetallic strip 5 is secured to the transverse wall 2 by means of a screw 12 mounting a heat-conductive bridge 13. A second bridge 14 which is likewise heat conductive is connected to the heat conductive bridge 13 by two screws 15. The PTC resistor 4 and a corrugated spring 16 provided with connector tabs 17, 18 is clamped between the bridge 14 and the transverse wall 2 by the screws 15.

Figure 2:
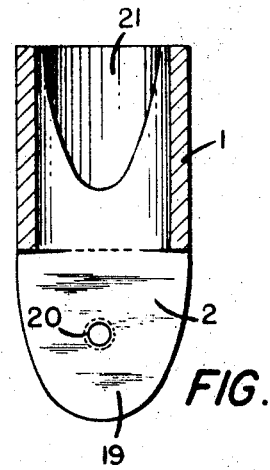
FIG. 2 is a section view taken at 90° relative to that of FIG. 1.
Figure 3:
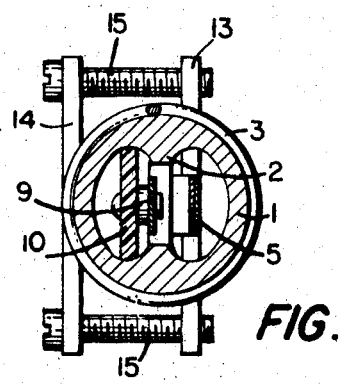
FIG. 3 is a cross section view taken on section line A—A of FIG. 1.
Figure 4:
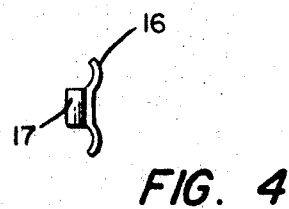
FIG. 4 is a plan view of a spring member in the embodiment illustrated in FIG. 1.

The transverse wall 2 has an extension 19 which, FIG. 2, projects downwardly out of the cylinder 1 and has a threaded hole 20 for receiving the screw 12 so that the foot of the bimetallic strip 5 is opposite to the resistor 4 on an opposite side of the transverse wall.

The transverse wall 2 extends over the entire axial length of the cylinder but is provided at one end with a V-shaped recess 21 which allows free flexure of the free ends of the bimetallic switch strips so that the contacts are given free play to carry out their make and break function. The wall 2 merges with the cylinder 1 in such a way that the carrier plate 10 is firmly clamped simply by inserting it between the transverse wall 2 and peripheral wall of the cylinder 1.

Figure 6:
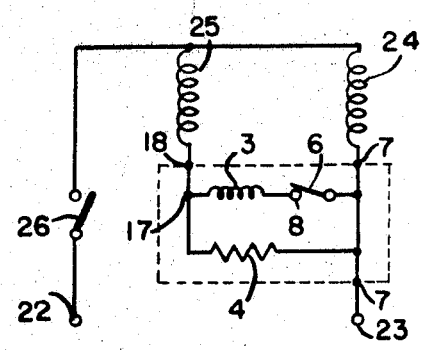
FIG. 6 is a diagrammatic circuit illustrating the use for a starting device according to the invention.

A circuit application of the thermally-responsive starting device as applied to a motor circuit is shown in FIG. 6 connected to a single-phase asynchronous motor. The starting device is illustrated as contained in a box shown in broken lines. The motor is fed from two mains terminals 22, 23 and has a main winding 24 and an auxiliary or starting winding 25 in the usual manner. A main switch 26 is closed for starting the motor the mains terminal 23 and main winding 24 are connected to the tab 7 of the bimetallic switch and the starting winding 25 is connected to the tab 18 of the spring. The tab 17 is connected to one end of the winding 3 and the other end of the winding 3 is connected to the contact 8.

Another type circuit, not shown, can be similarly arranged except that the holding heat source 4 bridges only the bimetallic switch contacts, 6, 8.

When the main switch 26 is closed current flows in the starting winding which is determined by the resistance of the starting winding 25 and the heating winding 3 since the PTC resistor 4 has a comparatively greater resistance value. Consequently the mass of the cylinder 1 and the transverse wall 2 are heated. The temperature of the bimetallic strip 5 and of the resistor 4 lag only slightly behind the temperature increase in the cylindrical body 1, 2 because of the excellent thermal conductivity between the first heating means and the switch itself. The bimetallic strip 5 is heated by radiation of the inner walls of the cylinder 1 and through the transverse wall. After a predetermined time delay, which depends upon the heat capacity of the body 1, 2 and the factors involved in the entire circuit, the body 1, 2 is heated to a temperature at which the switch 6, 8 opens.

Because of the excellent thermal transmission opening of the switch occurs only a short time after heating of the body so that the system becomes heated to only a little above the switch-off temperature of the bimetallic strip 5. In the meantime the PTC resistor 4 has also reached the temperature and continues to be heated and holds the bimetallic strip 5 in a deflected or open position. When the main switch 26 is opened the entire system is switched off and cooling occurs quite rapidly because of the large heat radiating surfaces of the body 1, 2 so that the unit is quickly ready for restarting.

The adjust screw 11 is set for prestressing the switch contact 6, 8. For example a prestress is set such that the switch has an opening temperature of 110° C. and adequate prestress exists at 80° C.

The body 1, 2 is made of aluminum treated by the eloxal process. Consequently, it has an oxide skin on its surface which has an electrically insulating effect, but does not adversely affect the transfer of heat from the winding 3 to the body 1, 2 and therefrom to the bimetal 5 and the PTC resistor 4. Due to the eloxal treatment, the body is almost black, so that intensive radiation is applied to the bimetal from the inner surfaces of the hollow body. The resistor wire 3 has a similar integral electrically insulating layer. Instead of this, other insulating means can be used, for example stoved lacquer.

Figure 5:
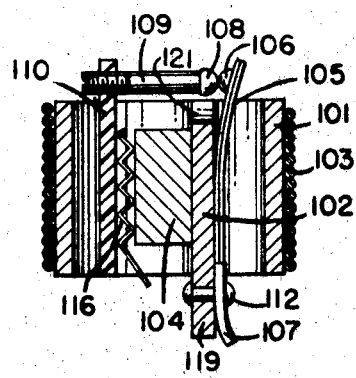
FIG. 5 is a longitudinal section view of a second embodiment of a device according to the invention.

In the embodiment shown in FIG. 5, corresponding parts are used, these are marked with the same reference numerals as in FIGS. 1–4, but increased by 100. In this construction, the transverse wall 107 is offset slightly from the central plane. At the bottom it has a smaller projection 119 and at the top a smaller recess 121. The PTC resistor 104 is disposed within the cylinder 101. It is pressed against the transverse wall 119 by a carrier plate 110 for a contact 108, a corrugated spring 116 is interposed between the resistor and the plate. The plate 110 bears against the inner periphery of the cylinder 101. It carries the counter-contact 108 on a rod 109, which can be axially screwed in and out of the carrier 101 for purposes of adjustment. This construction occupies still less space than the arrangement of FIGS. 1–4.

The drawings illustrate the embodiments of the invention on an enlarged scale. To give an idea of the actual smallness of the device, it may be mentioned that, in the case of the first embodiment, the diameter of the cylinder 1 need be only 10–20 mm. for a capacity of 1000 watts.

The opening heat-source can also consist of a hollow ceramic heating resistor, which surrounds the bimetal, not shown. Thus those skilled in the art will recognize that the invention teaches a highly effective and compact thermally-responsive motor starting device for use in single-phase motors.

While preferred embodiments of the invention have been shown and described it will be understood that many modifications and changes can be made within the true spirit and scope of the invention.

What we claim and desire to be secured by Letters Patent is:

1. A thermally-responsive starting device for a single-phase asynchronous motor having a main winding and a starting winding, said device comprising, a bimetallic switch connected in operation in series with said starting winding, a first heat-source for opening said switch to disconnect said starting winding comprising means defining a hollow body of high heat capacity disposed circumferentially of said switch, means to heat said hollow body and a second heat-source comprising means connected to said main winding holding said switch open when opened in response to heating thereof from said first heat-source.

2. A thermally-responsive starting device according to claim 1, in which said second heat-source comprises a transverse wall in said hollow body mounting said bimetallic switch, and said means connected to said main winding electrically heated mounted on said transverse-wall.

3. A thermally-responsive starting device according to claim 2, in which said body comprises a metallic tubular body and said switch is disposed extending axially therein.

4. A thermally-responsive starting device according to claim 3, in which said metallic body comprises an aluminum hollow body.

5. A thermally-responsive starting device according to claim 2, in which said means connected to said main winding comprises a resistor, and heat-conductive bridge means providing a thermal bridge between said resistor and said transverse wall.

6. A thermally-responsive starting device according to claim 5, in which said switch comprises metallic strips one at least of which comprises a bimetallic strip, electrical contacts mounted on free end portions of said strips and in which said bimetallic strip is mounted on said transverse wall on a side opposite to said resistor.

7. A thermally-responsive starting device according to claim 6, in which said transverse wall extends substantially the entire axial length of said hollow body.

8. A thermally-responsive starting device according to claim 7, in which said means to heat said hollow body comprises a coil wound around said hollow body connected in operation across said main winding and said starting winding.

9. A thermally-responsive starting device according to claim 6, in which said transverse wall extends outwardly of said hollow body.

10. A thermally-responsive starting device according to claim 1, in which second heat-source comprises a heating resistor connected across said windings, and in which said resistor is disposed internally of said hollow body.

11. A thermally-responsive starting device according to claim 1, in which said hollow body comprises a metallic body having an oxide insulating layer, an electrical heating coil around said body having an integral insulating layer.

References Cited

UNITED STATES PATENTS

| | | | |
|---|---|---|---|
| 1,701,757 | 2/1929 | Lea | 337—103 |
| 2,403,803 | 6/1946 | Kearsley | 337 |
| 2,417,912 | 3/1947 | Clark | 318—221 |
| 3,434,089 | 3/1969 | Waseleski | 337—40 |

ORIS L. RADER, Primary Examiner

G. Z. RUBINSON, Assistant Examiner

U.S. Cl. X.R.

337—102, 104